United States Patent Office 3,435,488
Patented Apr. 1, 1969

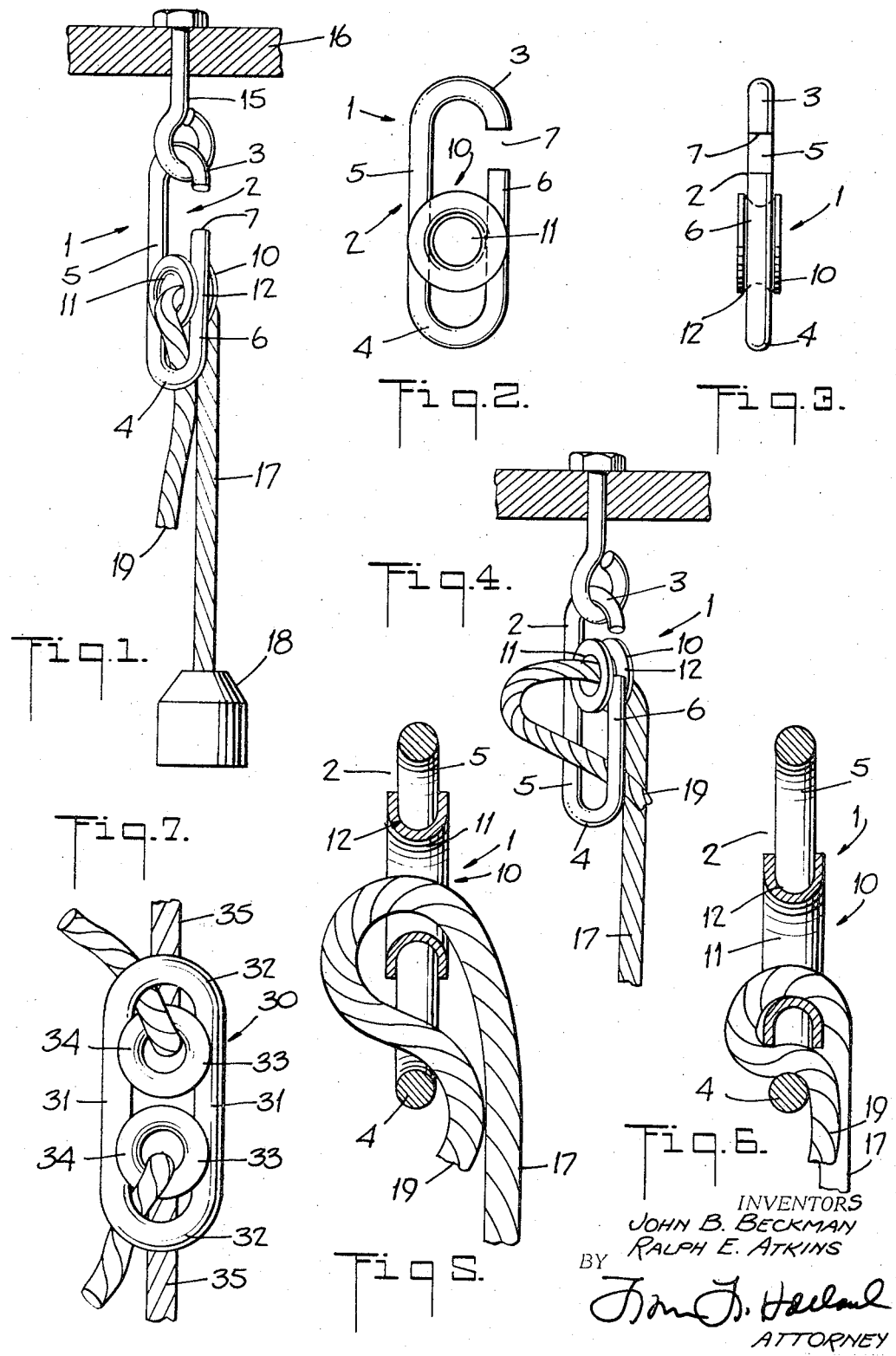

3,435,488
CLAMP ASSEMBLY
John B. Beckman, Northvale, and Ralph E. Atkins, Saddle Brook, N.J., assignors to F. P. T. Hycaflex, Inc., Rochelle Park, N.J., a corporation of New Jersey
Filed June 29, 1967, Ser. No. 649,970
Int. Cl. F16g *11/04*
U.S. Cl. 24—126        6 Claims

ABSTRACT OF THE DISCLOSURE

The present invention comprises an improved clamp assembly for rope, cables, etc. which comprises a clamp member having a pair of opposed bearing legs or guide surfaces, a roller having an opening therein is adapted to move between said bearing legs and a lower clamping surface. Rope is inserted into the opening in the roller and the end of the rope is wound beneath the roller and over the clamping surface so that when the roller is forced downwardly it will cooperate with the lower clamping surface to clamp the rope tightly therebetween.

---

The present invention is directed to an improved clamp assembly and more particularly to an improved clamp assembly adapted to be used in connection with ropes for medical traction devices, tents, truck covers, and the like.

Such a clamp assembly may be used in places where rope, cord, line or wire, etc. is to be secured to a fixed or movable object and to which a device may be attached to the rope end or where two ends of rope, or the like, may be fastened to each other.

Heretofore complicated devices have been designed to securely tie rope and the like in place and especially where a weight is to be attached to the rope for use in various purposes, such as medical traction devices. Such prior devices have incorporated therein the usual block-and-tackle assembly, springs and other complicated devices which are expensive and unwieldly.

The present invention overcomes the drawbacks of these devices and has for its object the provision of an improved self-locking clamp assembly.

Another object of the present invention is the provision of an improved self-locking clamp assembly which is simple to operate.

Another object of the present invention is the provision of an improved self-locking clamp assembly which will securely hold a rope in place.

Another object of the present invention is the provision of an improved self-locking clamp which is inexpensive to manufacture and easy to assemble.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view showing the improved self-locking clamp assembly of the present invention in its operative position;

FIG. 2 is a side view of the mechanical clamp assembly of the present invention;

FIG. 3 is an end view thereof;

FIG. 4 is a fragmentary perspective view showing the manner of placing the rope in clamping position in accordance with the present invention;

FIG. 5 is a sectional view showing the relative position of the parts before the clamp is tightened;

FIG. 6 is a sectional view showing the relative position of the parts after the clamp is tightened; and FIG. 7 shows embodiment of the present invention.

Referring more particularly to the drawings, the clamp assembly 1 comprises a single piece body portion 2 having an upper hook end 3, a lower clamping surface 4, a first bearing leg 5 extending upwardly from one side of clamping surface 4 and integral with upper hook end 3, and a second bearing leg 6 opposite bearing leg 5 which extends upwardly from the bearing surface 4 and terminates short of upper hook end 3 to provide a space 7.

In the drawings the body portion 2 is shown as being made of a single piece round stock material. While this is preferred, it will be understood that the various parts of the body portion 2 may be made of separate parts mounted together and may also be made of stock materials other than round.

The drawings also show that the bearing leg 6 is spaced from hook end 3. Here again, while this is the preferred embodiment, it is within the purview of the present invention to make the leg 6 contact the hook end 3 so that there is no space. In addition, for convenience the clamp assembly 1 is shown and described as used in connection with rope. However, it will be understood that whenever the word "rope" is used herein, it is intended to apply to chains, cables, cord, etc.

A clamping roller 10 having an opening 11 therein is positioned between the bearing legs or guide surfaces 5 and 6 and has a peripheral U-shaped groove 12 therein adapted to roll on bearing legs or guide surfaces 5 and 6. Although the clamping roller 10 is shown in the drawings in the form of a roller, it is within the purview of the present invention to use a clamp roller 10 which is not circular as long as it will slide between bearing legs 5 and 6.

The hook end 3 is adapted to hang from an eye 15 in a support structure 16 or from any other hanging means such as a hook or a rope. A rope 17 having one end with a wieght 18 thereon and its other end 19 free, is adapted to be used with the clamp assembly 1. The free end 19 is first inserted into the opening 11 of the clamping roller 10 while the clamping roller is in its uplifted position away from the clamping end 4 (FIGS. 4 and 5). The free end 19 of the rope 17 is then inserted beneath the roller 10 and above the clamping end 4 of the clamp assembly 2. The clamping roller 10 is then moved down until the free end 19 of the rope is securely clamped between the clamping roller 10 and the clamping end 4 (FIG. 6). This may be done either by pulling the free end 19 of the rope downwardly to force the clamping roller 10 down or by forcing the clamping roller 10 down by other means. The weight 18 exerts a downward force on the clamping roller 10 which holds the rope 17 securely in place. The greater the force exerted by the weight 18, the greater the holding power of the clamping roller 10. Thus a self-locking clamping assembly is achieved.

When it is desired to release the rope or to adjust the height of the weight 18, the clamping roller 10 is moved upwardly and the free end of the rope is pulled out.

In FIG. 7 a double tie clamp assembly 30 is shown. The clamp 30 has a pair of bearing surfaces 31 and a pair of opposed clamping surfaces 32. The clamp assembly 30 has a pair of clamping rollers 33 each of which have openings 34 therein to receive rope 35 therein. The clamping action is similar to the clamping action described in connection with FIGS. 1 to 6. It will be seen that with this clamp assembly two ropes, or both ends of one rope, may be easily clamped together.

It will thus be seen that the present invention provides a simple and inexpensive clamping assembly for holding weights which does not require complicated mechanisms and in which the force of the weight applied will increase the locking power of the clamp. Thus the present invention provides an improved clamp assembly which is simple to manufacture and to operate.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having described our invention, we claim:

1. A clamp assembly comprising a body portion formed solely of a uniform rod-like member having a circular cross-sectional configuration and a movable circular clamping element, said body portion comprising a pair of parallel opposed guiding surfaces, an arcuate clamping surface connecting said guiding surfaces together at one end, an arcuate hanging element at the end opposite said clamping surface, said clamping element movable between said opposed guiding surfaces relative to said clamping surface and having a peripheral surface that includes a peripheral groove adapted to move on said guiding surfaces, said clamping element having an opening therein and being adapted to cooperate with said arcuate clamping surface whereby insertion of a rope through said opening and positioning of the rope between clamping surface and said clamping element will lock said rope in position.

2. A clamp assembly as claimed in claim 1, wherein said clamping element comprises a clamping roller adapted to move between said guiding surfaces.

3. A clamp assembly as claimed in claim 1 wherein said hanging element is integral with one of said bearing surfaces and is spaced from the other bearing surface and wherein said bearing surfaces are integral with said clamping surface.

4. A clamp assembly as claimed in claim 1 wherein a pair of clamping surfaces are provided and a pair of clamping elements are adapted to cooperate therewith.

5. A clamp assembly as claimed in claim 4, wherein said clamping elements are rollers, each roller having an opening therein.

6. A clamp assembly as claimed in claim 5, wherein said hanging means are connected to both of said guiding surfaces.

References Cited

UNITED STATES PATENTS

| 629,906 | 8/1899 | Kerngood | 24—171 X |
| 646,651 | 4/1900 | Washburne | 24—196 |
| 1,519,708 | 12/1924 | Tapp. | |
| 1,868,810 | 7/1932 | White | 24—196 |
| 3,193,898 | 7/1965 | Holman | 24—196 |

FOREIGN PATENTS

| 2,169 | 5/1878 | Great Britain. |
| 295,645 | 5/1965 | Netherlands. |

BERNARD A. GELAK, *Primary Examiner.*